United States Patent [19]
Halbout et al.

[11] Patent Number: 5,408,319
[45] Date of Patent: Apr. 18, 1995

[54] OPTICAL WAVELENGTH DEMULTIPLEXING FILTER FOR PASSING A SELECTED ONE OF A PLURALITY OF OPTICAL WAVELENGTHS

[75] Inventors: Jean-Marc Halbout, Larchmont; George V. Treyz, New York, both of N.Y.

[73] Assignee: International Business Machines Corporation, Armonk, N.Y.

[21] Appl. No.: 938,964

[22] Filed: Sep. 1, 1992

[51] Int. Cl.6 ............................................. G01B 9/02
[52] U.S. Cl. .................................. 356/352; 356/345
[58] Field of Search ....................... 356/352, 345, 346

[56] References Cited

U.S. PATENT DOCUMENTS

| | | | |
|---|---|---|---|
| 4,525,687 | 6/1985 | Chemla et al. | 332/7.51 |
| 4,756,606 | 7/1988 | Jewel et al. | 356/352 |
| 4,790,634 | 12/1988 | Miller et al. | 356/352 |
| 5,059,026 | 10/1991 | Zoechbauer | 356/352 |
| 5,068,749 | 11/1991 | Patel | 356/352 |

*Primary Examiner*—Samuel A. Turner
*Assistant Examiner*—Robert Kim
*Attorney, Agent, or Firm*—Robert M. Trepp; Ronald L. Drumheller

[57] ABSTRACT

A method and apparatus for selecting an optical wavelength is provided incorporating a layer of silicon with two juxtaposed partially-reflective mirrors to provide a Fabry-Perot cavity and ohmic contacts to the silicon layer for heating the silicon layer to provide a temperature change to change its index of refraction. The invention overcomes the problem of mechanically tuning a Fabry-Perot cavity for wavelength division multiplexing (WDM).

28 Claims, 2 Drawing Sheets

OPTICAL WAVELENGTH DEMULTIPLEXING FILTER FOR PASSING A SELECTED ONE OF A PLURALITY OF OPTICAL WAVELENGTHS

FIELD OF THE INVENTION

This invention relates to wavelength division multiplexing (WDM) for optical communications, and more particularly, to a compact and stable Fabry-Perot Interferometer for demultiplexing wavelengths in a spectral region.

BACKGROUND OF THE INVENTION

Wavelength division multiplexing (WDM) is seen as an increasingly attractive method of using the full bandwidth available of optical fiber, for example, in the 1.3–1.5 μm low attenuation band. For instance, multiple diode lasers, each having an independent wavelength can be used in a WDM system. An integral component of this type of optical fiber network is a wavelength demultiplexing filter. Important criteria for a suitable wavelength demultiplexing filter includes frequency stability, compactness, tuning time, cost, and compatibility with very large scale integrated (VLSI) circuit manufacturing technology. Currently, no suitable wavelength demultiplexing filter has emerged that meets the above criteria.

Wavelength division filters may be implemented with interferometers. Schemes presently being investigated include these based on Fabry-Perot Interferometers with mechanically-tuned mirror spacings. In one scheme, micro-machined interferometers have been fabricated that consist of parallel silicon membranes with an electrostatically tunable spacing which was described in a publication by S. R. Mallinson and J. H. Jerman entitled, "Miniature Micro Machined Fabry-Perot Interferometers in Silicon", Vol. 23, page 1041, Sept. 1987. A voltage is placed across the parallel silicon membranes which allows them to be moved as a function of the voltage applied forming an optical cavity with a nominal 3.5 μm air gap.

In a paper by X. Xiao et al. entitled, "Fabry-Perot Optical Intensity Modulator at 1.3 μm in Silicon", IEEE Photon. Technol. Lett., Vol. 3, page 230, March 1991, a high-finesse Fabry-Perot resonant cavity is described formed by two silicon dioxide mirrors spaced apart by silicon which is doped to form a p-i-n diode optical phase modulator inside the cavity. The free carriers injected in the p-i-n diode are used to modulate the optical phase of light passing therethrough and, thus, the index of refraction in silicon. The presence of free carriers also creates free carrier absorption. An optical fiber may be positioned above the device normal to the silicon surface and the mirrors of the cavity. The Fabry-Perot cavity functions to convert phase modulation into intensity modulation.

SUMMARY OF THE INVENTION

In accordance with the present invention, a method and apparatus for selecting an optical wavelength is described comprising a first layer of semiconductor such as silicon having a predetermined thickness and an upper and lower surface, first and second electrical contacts positioned across a first region of the first layer, the electrical contacts adapted for connection to a current or power source to provide a predetermined current or power for heating the first region of the first layer to provide a predetermined temperature rise of the first region to provide a thermally induced change in the index of refraction of the first region, a first partially-reflective mirror adjacent the upper surface of the first layer, and a second partially-reflective mirror adjacent the lower surface of the first layer, the first and second partially-reflective mirrors and the first region of the first layer aligned to permit a selected optical wavelength to resonate in the first region and to pass therethrough.

The invention may further provide an optical fiber positioned in fixed relationship with the second partially-reflective mirror to input optical radiation into the first layer.

The invention may further provide a detector positioned to receive optical radiation passing from the first region through the first partially-reflective mirror in the range from 1.3–1.55 micrometers.

The invention may further provide a current or power source responsive to control signals to provide a predetermined current or power.

The invention may further provide a second layer of semiconductor such as silicon having a predetermined thickness and an upper and lower surface, the lower surface of the second layer positioned over the first partially-reflective mirror, a third partially-reflective mirror positioned adjacent the upper surface of the second layer, third and fourth electrical contacts positioned across a first region of the second layer, the third and fourth electrical contacts adapted for connection to a current or power source responsive to control signals to provide a predetermined current or power for heating a first region of the second layer to provide a predetermined temperature rise of the first region to provide a thermally induced change in the index of refraction of the first region or the second layer, the first, second and third partially-reflective mirrors and the first regions of the first and second layers aligned to permit a selected optical wavelength to resonate in the first regions and to pass therethrough.

BRIEF DESCRIPTION OF THE DRAWING

These and other features, objects, and advantages of the present invention will become apparent upon a consideration of the following detailed description of the invention when read in conjunction with the drawing, in which.

DESCRIPTION OF THE PREFERRED EMBODIMENT

Figure 1:
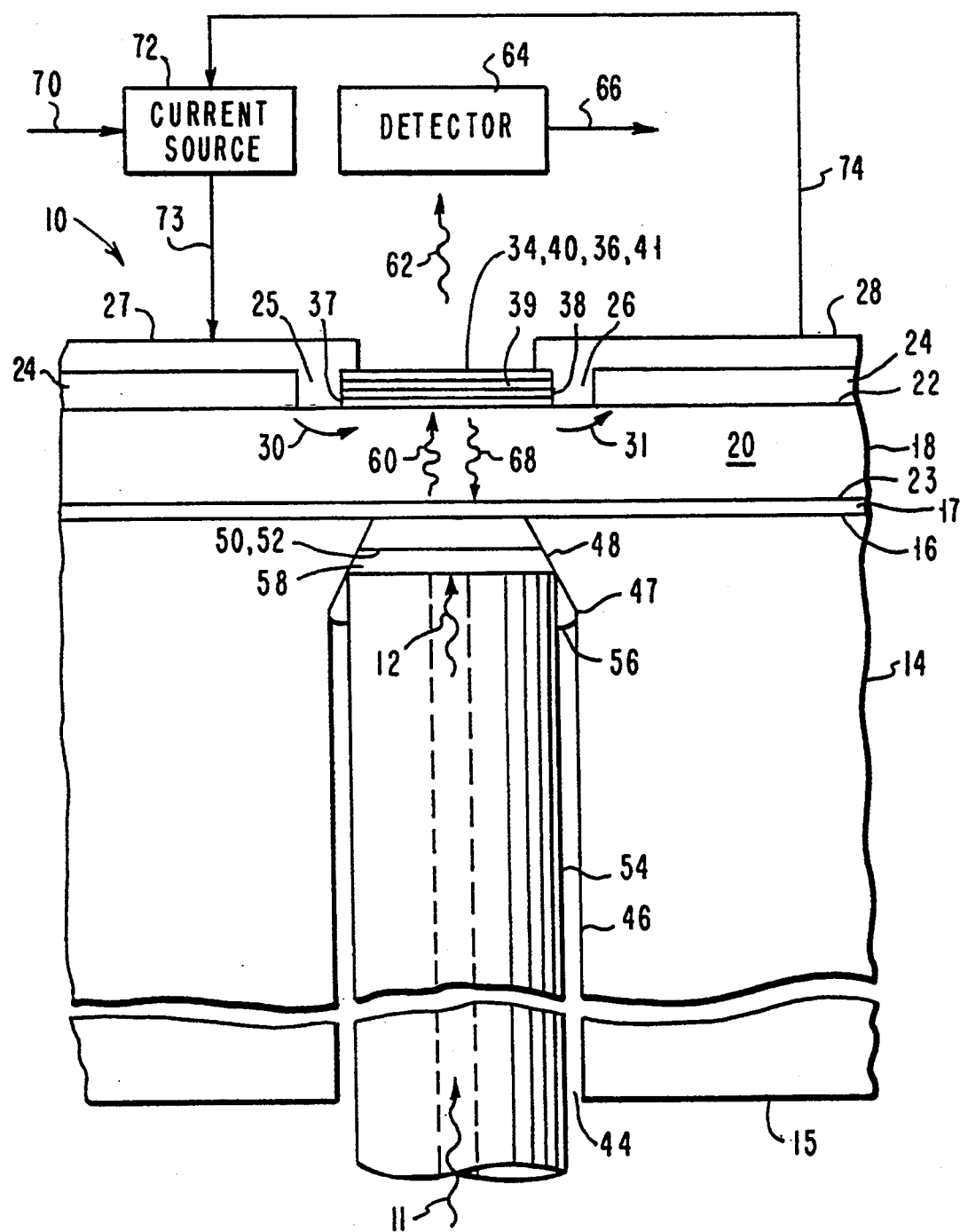
FIG. 1 shows a cross-section view of one embodiment of the invention.

Referring to the drawing, FIG. 1 shows a schematic diagram of device 10 for selecting an optical wavelength from input optical radiation shown by arrows 11 and 12. A substrate 14 which may be, for example, single crystalline semiconductor such as silicon has a back side or lower surface 15 and an upper surface 16. On upper surface 16, a layer 17 may be epitaxially deposited, for example, by chemical vapor deposition having a doping in the range from $10^{19}$ to $10^{20}$ atoms/cc. Above layer 17, a semiconductor layer 18 such as silicon may be formed which is epitaxial having a thickness in the range from $5 \times 10^4$ to $10 \times 10^4$ Angstroms. Layer 18 may have a first region 20 which has a doping level in the range from $1 \times 10^{14}$ to $5 \times 10^{18}$ atoms/cm$^3$ to provide a selected resistivity of layer 18 in region 20. The doping may be formed during the epitaxial deposition of layer 18 which may be formed by chemical vapor deposition. Layer 18 may have a uniform resistivity and a uniform doping therein. Layer 18 may have an upper surface 22 and a lower surface 23. Upper surface 22 may be parallel to lower surface 23. On upper surface 22 is a layer 24 of electrical insulation which may be, for example, silicon dioxide. Layer 24 may have openings 25 and 26 which are spaced apart to define region 20 there between. A conductive material such as metal, i.e. aluminum or polysilicon may be deposited in openings 25 and 26 and patterned to form first contact 27 and second contact 28. First and second electrical contacts 27 and 28 may be adapted for connection to a current or power source responsive to control signals to provide a predetermined current or power through region 20 shown by arrows 30 and 31. The electrical current functions to provide resistive heating to region 20 to provide a predetermined temperature rise of region 20 to provide a thermally induced change in the index of refraction of region 20. Region 20 extends between upper surface 22 and lower surface 23 of layer 18. It is noted that FIG. 1 is not to scale and that the thickness of layer 18 is shown much greater relative to, For example, the spacing between contacts 25 and 26. The doping level in layer 18 will provide a selected resistivity of layer 18.

On upper surface 22 above region 20 is positioned a first partially-reflective mirror 34. Partially-reflective mirror 34 may be provide by forming a thin layer of metal on upper surface 22. Alternatively, partially-reflective mirror 34 may be formed by alternating high and low (index of refraction) quarter wave dielectric layers to form a dielectric stack 36 of a plurality of layers, for example, layers 37 through 40. Layers 37 and 39 may be titanium oxide ($TiO_2$). Layers 38 and 40 may be silicon dioxide ($SiO_2$).

An opening 44 may be formed in lower surface 15 of substrate 14 such as by reactive-ion etching (RIE) or plasma anisotropic etching and extend through substrate 14 to the proximity of layer 17. An etchant such as potassium hydroxide (KOH) may be used to finish the etching process, stopping at layer 17 if layer 17 is heavily doped, for example, a P+ layer. The anisotropic etching of opening 44 provides generally vertical sidewalls 46 perpendicular to lower surface 15. The anisotropic etching may end at point 47 shown on sidewall 46. The etchant used, for example, KOH on substrate 14 from point 47 to layer 17 may provide tapered sidewalls 48 due to the crystallographic surfaces formed by wet etching when substrate 14 has an upper surface 16 along the <100>plane. With opening 44 extending from lower surface 15 to upper surface 16 of substrate 14, a second partially-reflective mirror 50 may be formed adjacent layer 17 and in near proximity of lower surface 23 of layer 18. Second partially-reflective mirror 50 may be implemented as a thin metal film or as a dielectric stack 52. Dielectric stack 52 may be made similarly as dielectric First partially-reflective mirror 34 and second partially-reflective mirror 50 may be designed with selected materials to provide heat confinement in region 20 thereby reducing the power required to be dissipated in region 20 by resistive heating for device operation. Thus, the electrical current or power applied from contact 27 through region 20 to contact 28 may be reduced if partially-reflective mirrors 34 and 50 confine heat in region 20 of layer 18.

An optical fiber 54 may be inserted in opening 44 up against tapered sidewalls 48 as shown in FIG. 1. Optical fiber 54 may be held in place in opening 44 by optical adhesive 56, which further may provide improved index matching between fiber 54 and dielectric stack 52. Sidewalls 48 which have a taper, limit the insertion distance of optical fiber 54 in opening 44 and allows the formation of a gap, space or region 58. Region 58 protects the thin region 20 of layer 18 from damage due to contact of fiber 54.

In operation, input optical radiation, as shown in FIG. 1 by arrows 11 and 12, pass through optical fiber 54 through region 58 through second partially-reflective mirror 50, through layer 17 into layer 18 as shown by arrow 60. A portion of the optical radiation passes through first partially-reflective mirror 34 as shown by arrow 62 and enters detector 64. Detector 64 functions to detect optical radiation shown by arrow 62 to provide a signal on lead 66. A portion of the optical radiation in layer 18, region 20, shown by arrow 60 is reflected by first partially-reflective mirror 34 as shown by arrow 68. The optical radiation shown by arrow 68 is reflected by the second partially-reflective mirror 50 back in the direction shown by arrow 60. Certain wavelengths of the optical radiation will resonate or be more fully reflected than other wavelengths and will provide resonant peaks and transmission peaks. In order for device 10 operating in the range from 1.3 to 1.55 micrometers to have widely spaced wavelength transmission peaks, the effective cavity length, L, must be on the order of 5 micrometers for silicon. The cavity length, L, is the thickness of layer 18 and 17 in region 20. In general, the wavelength at which a Fabry-Perot cavity will resonate may be selected by either tuning the cavity length or the index of refraction of the cavity. In the present invention, the wavelength transmitted by the cavity is selected by thermally changing the index of refraction of the silicon in the cavity. The temperature of the cavity is adjusted by passing a current in the proximity or in the cavity to provide ohmic heating. The effect of thermal expansion is less than the effect of a change in the index of refraction in the silicon cavity. The cavity length, L, allows accurate frequency or wavelength tuning of selected optical radiation by means of changing the temperature of region 20, the cavity. The change in the index of refraction of silicon with temperature is $2 \times 10^{-4} k^{-1}$. A 1 degree Celsius temperature change in region 20 of silicon having a length L equal to 5 micrometers would produce a phase shift of $(2\pi/\lambda) \times 10^{-3}$. A cavity in air having the same length would experience the same phase shift with a displacement of its length L of just 50 Angstroms.

The doping level of the silicon layer 18 can be chosen to optimize the electrical resistivity of region 20 provided a doping level of approximately $10^{17}/cm^3$ is not exceeded which would introduce free carrier absorption losses of the optical radiation shown by arrows 60 and 68. The ohmic contacts of first and second contacts 27 and 28 to silicon layer 18 at upper surface 22 are at the edge of or outside of region 20, the illuminated region, therefore if additional doping is needed to reduce contact resistance to first and second contacts 27 and 28, it will not affect the performance of device 10. Additionally, the optical absorption due to free carriers in the optical cavity can be further reduced by placing the contacts such that current flows in a region of silicon layer 18 that is adjacent to the illuminated portion.

In this case, the illuminated region is heated by thermal diffusion from the ohmically heated regions.

A control signal on lead 70 to current and or power source 72 may provide for a predetermined current or power on lead 73 connecting to contact 27 from current or power source 72. Lead 74 provides electrical connection from contact 28 to current and or power source 72.

Figure 2:
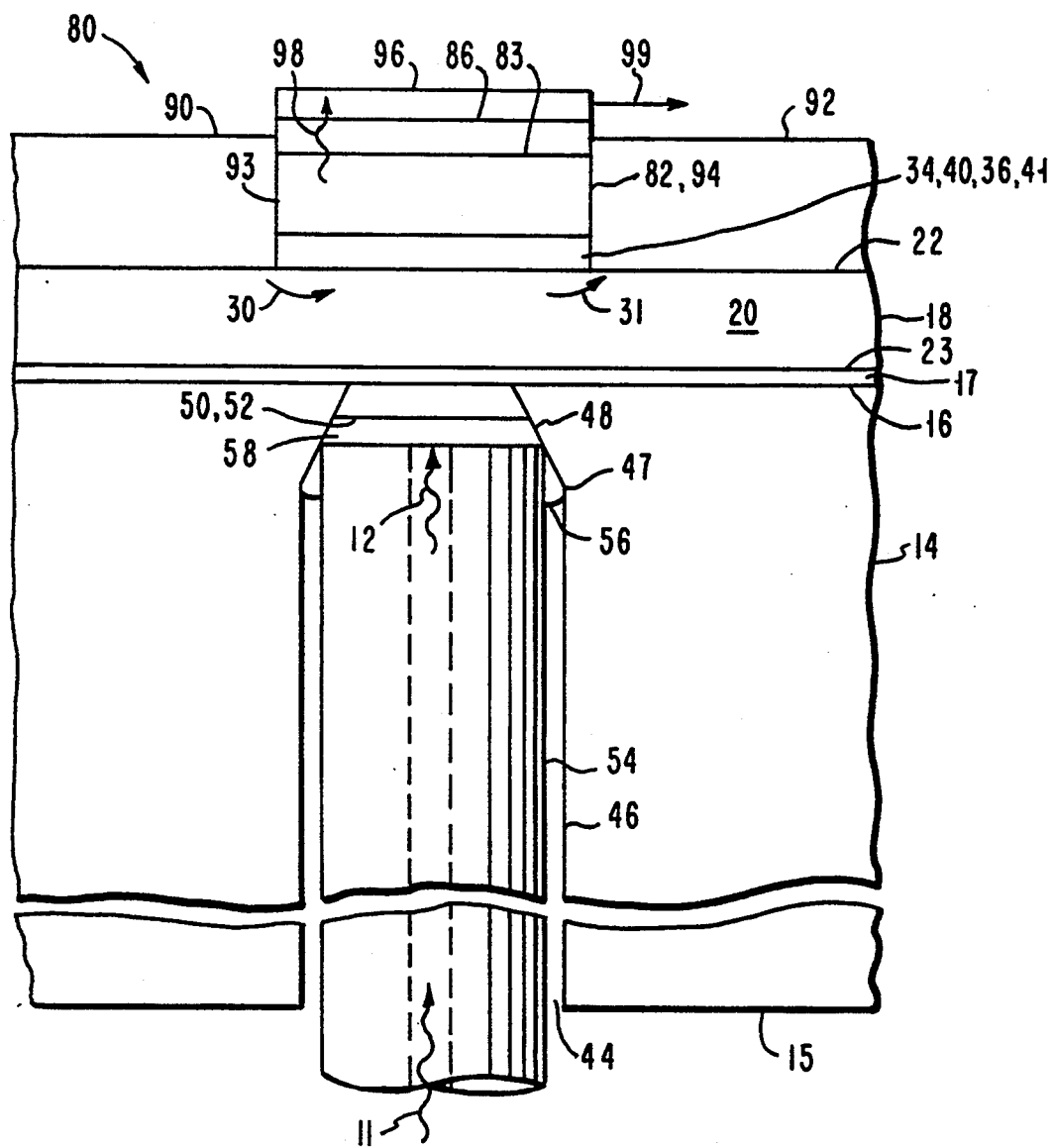
FIG. 2 shows a cross-section view of a second embodiment of the invention.

Referring to FIG. 2, device 80 is shown having two regions or cavities 20 and 82 cascaded, coupled in series, or in tandem. Regions 20 and 82 form two coupled Fabry-Perot etalons in series. In FIG. 2, like references are used for functions corresponding to the apparatus of FIG. 1. By using two Fabry-Perot etalons in series, one can expect an order of magnitude drop in the required tuning temperature in regions 20 and 82 while obtaining an Interferometer with the same spectral range. As shown in FIG. 2, an additional semiconductor layer such as silicon may be formed on top of first partially-reflective mirror 34 is performed. Possible growth techniques include, polysilicon deposition followed by laterally scanned melt/regrowth seeded from the substrate crystal or crystallographically dependent growth-rate overgrowth. Either growth technique could be followed by a mechanical polish of upper surface 83 to provide an optical finish. A third partially-reflective mirror 86 is formed on upper surface 83. A first contact 90 and a second contact 92 may be formed of conductive material on upper surface 22 and in ohmic contact with edges 93 and 94 of region 82. Contacts 90 and 92 function to provide current or power through regions 20 and 82. Contacts 90 and 92 may be doubled to provide separate current or power paths through regions 20 and 82. A detector 96 such as a photo diode may be formed on third partially-reflective mirror 86 to detect optical radiation passing from region 82 into detector 96 as shown by arrow 98. Detector 96 provides a signal on lead 99 in response to detecting optical radiation shown by arrow 98.

In operation of device 80, optical radiation passes from region 20 into region 82 where region 82 is selective to certain wavelengths of radiation which resonate in region 82 and pass into detector 96.

The invention provides a compact, thermally-tunable Fabry-Perot interferometer. The interferometer may be used as a selective wavelength filter in the 1.3 μm to 1.55 μm wavelength regime. The transmission peak of the device may be tuned by applying a current to ohmically-heat a silicon cavity. Because the index of refraction of silicon is strongly dependent on temperature, the wavelength that is passed through the device can be efficiently selected by adjusting the cavity temperature. Further, the index of refraction can be thermally tuned in approximately 50 μs. The device can be used as a wavelength filter in, for example, a multiple wavelength fiber optic communications system. The device may be readily constructed using a variety of standard semiconductor processing techniques and holds the potential of substantial integration with semiconductor devices such as in silicon or silicon-on-insulator chips.

While the present invention has been shown and described with respect to specific embodiments, it is not thus limited. Numerous modifications, changes, and improvements will occur which fall within the spirit and scope of the invention.

Having thus described my invention, what we claim as new and desire to secure by Letters Patent is:

1. An apparatus for selecting an optical wavelength comprising:

a first layer of semiconductor material having a predetermined thickness and an upper and lower surface, first means for passing an electrical current through a first region of said first layer to resistively heat said first region to provide a predetermined temperature rise of said first region to provide a thermally induced change in the index of refraction of said first region, second means to provide a first partially reflective mirror adjacent said upper surface of said first region, and third means to provide a second partially-reflective mirror adjacent said lower surface of said first layer, said first and second partially-reflective mirrors and said first region being aligned to permit a selected optical wavelength to resonate in said first region and to pass therethrough.

2. The apparatus of claim 1, wherein said first partially-reflective mirror includes a plurality of layers of dielectric material.

3. The apparatus of claim 2, wherein said plurality of layers of dielectric material includes a layer of $TiO_2$ and a layer of $SiO_2$.

4. The apparatus of claim 1, wherein said first partially-reflective mirror includes a layer of metal.

5. The apparatus of claim 1, wherein said first region has a doping level in the range from $1 \times 10^{14}$ to $5 \times 10^{18}$ atoms/cm$^3$ to provide a selected resistivity.

6. The apparatus of claim 1, wherein said first layer has a thickness in the range from $5 \times 10^4$ to $10 \times 10^4$ Angstroms.

7. The apparatus of claim 1, further including fourth means for attaching optical fiber in the proximity of said third means to couple light through said second partially-reflective mirror.

8. The apparatus of claim 1, wherein said first layer of semiconductor material includes a layer of silicon.

9. The apparatus of claim 1, further including an epitaxial detector operating in the range from $1 \times 10^4$ to $2 \times 10^5$ Angstroms positioned to intercept light passing through said second partially-reflective mirror.

10. The apparatus of claim 1, further including a second layer of material to provide an etch stop,
said second layer having an upper and lower surface, said upper surface of said second layer positioned adjacent said lower surface of said first layer.

11. The apparatus of claim 10, wherein said second layer includes a silicon layer having doping in the range from $10^{19}$ to $10^{20}$ atoms/cc.

12. The apparatus of claim 10, wherein said second layer includes a silicon dioxide layer.

13. The apparatus of claim 1, wherein said first means includes first and second electrical contacts positioned across said first region of said first layer, said first and second electrical contacts adapted for connection to a power source responsive to control signals to provide a predetermined power.

14. The apparatus of claim 1 further including fourth means for introducing optical radiation through one of said first and second partially-reflective mirrors into said first region of said first layer.

15. The apparatus of claim 1 further including a detector positioned to intercept optical radiation exiting said first region of said first layer through one of said first and second partially-reflective mirrors.

16. An apparatus for selecting an optical wavelength comprising:
- a first layer of semiconductor material having a predetermined thickness and an upper and lower surface,
- first means for passing an electrical current through a first region of said first layer to provide a predetermined temperature rise of said first region to provide a thermally induced change in the index of refraction of said first region,
- second means to provide a first partially reflective mirror adjacent said upper surface of said first layer,
- third means to provide a second partially-reflective mirror adjacent said lower surface of said first layer,
- a second layer of semiconductor material having a predetermined thickness and an upper and lower surface, said lower surface of said second layer being positioned over said second means,
- fourth means to provide a third partially-reflective mirror adjacent said upper surface of said second layer, and
- fifth means, for passing an electrical current through a first region of said second layer to provide a predetermined temperature rise of said first region second layer to provide a thermally induced change in the index of refraction of said first region of said second
- said first, second and third partially-reflective mirrors of said first regions of said first and second layers being aligned to permit a selected optical wavelength to resonate in said first regions of said first and second layers and to pass therethrough.

17. The apparatus of claim 16, wherein said second layer of semiconductor material includes a layer of silicon.

18. The apparatus of claim 16, wherein said fifth means includes first and second electrical contacts positioned across said first region of said second layer, said first and second electrical contacts adapted for connection to a power source responsive to control signals to provide a predetermined power.

19. A method for selecting an optical wavelength in a device having a first layer of semiconductor having a predetermined thickness and an upper and lower surface,
- a first partially-reflective mirror adjacent said upper surface of said first layer, and
- a second partially-reflective mirror adjacent said lower surface of said first layer,
- said first and second partially-reflective mirrors and a first region of said first layer being aligned to permit a selected optical wavelength to resonate in said first region of said first layer of semiconductor and to pass therethrough, comprising the steps of:
- introducing optical radiation through one of said first and second partially-reflective mirrors into a first region of said first layer, and
- passing an electrical current through said first region of said first layer to provide a predetermined temperature rise of said first region to resistively heat said first region to provide a thermally induced change in the index of refraction of said first region.

20. The method of claim 19 wherein said step of introducing optical radiation includes the step of attaching optical fiber to said device to couple optical radiation through one of said first and second partially-reflective mirrors into said first region of said first layer.

21. The method of claim 19 further including the step of detecting the intensity of optical radiation exiting said first region of said first layer through one of said first and second partially-reflective mirrors.

22. In a wavelength division multiplexing (WDM) optical communication system in which a plurality of different predetermined optical wavelengths are used for optical communication and are combined together to form a multiplexed optical communication signal, an optical wavelength demultiplexing filter for passing a selected one of said plurality of optical wavelengths, comprising:
- a layer of semiconductor material, including a region thereof between two parallel facing mirrors forming an optical cavity, said optical cavity and mirrors creating a Fabry-Perot interferometer,
- said semiconductor material having an index of refraction which varies with temperature;
- means coupling said multiplexed optical communication signal into said interferometer;
- means coupling light passed by said interferometer to a detector; and
- electrical contacts on said semiconductor material for flowing electrical current though said region of semiconductor material between said mirrors to resistively heat said region of semiconductor material to a selected one of a plurality of different temperatures,
- each of said temperatures corresponding to a different index of refraction value for said semiconductor material,
- said interferometer passing a different one of said optical wavelengths at each of said different index of refraction values.

23. An optical wavelength demultiplexing filter as defined in claim 22 wherein
- said layer of semiconductor material has an upper and lower surface and said mirrors are positioned on said upper and lower surfaces in facing alignment with each other.

24. An optical wavelength demultiplexing filter as defined in claim 23 wherein said electrical contacts are positioned on one of said surfaces on opposite sides of said mirror on said surface to flow electrical current transversely through said layer between said mirrors.

25. An optical wavelength demultiplexing filter as defined in claim 22 wherein
- said semiconductor material has an index of refraction which varies substantially linearly with temperature.

26. An optical wavelength demultiplexing filter as defined in claim 25 wherein
- said semiconductor material is silicon.

27. An optical wavelength demultiplexing filter as defined in claim 22 wherein:
- said mirrors of said interferometer are partially reflective and partially transmissive;
- said means coupling said multiplexed optical communication signal into said interferometer includes a light waveguide for directing a portion of said multiplexed optical communication signal onto and through one of said mirrors; and
- said means coupling light passed by said interferometer to a detector includes means coupling light passing through the other one of said mirrors to said detector.

28. An optical wavelength demultiplexing filter as defined in claim 27 wherein
said means coupling light passing through said other one of said mirrors comprises positioning said detector in alignment with said other one of said mirrors for receiving light passing through said other one of said mirrors.

* * * * *